United States Patent Office.

WILLIAM S. RYERSON, OF PHILADELPHIA, PENNSYLVANIA.

Letters Patent No. 62,074, dated February 12, 1867.

IMPROVED ENAMEL FOR COVERING HOOP-SKIRT SPRINGS.

*The Schedule referred to in these Letters Patent and making part of the same.*

TO ALL WHOM IT MAY CONCERN:

Be it known that I, WILLIAM S. RYERSON, of Philadelphia, in the county of Philadelphia, and State of Pennsylvania, have invented a new and improved Protection for the Covering of Hoop-Skirt Springs; and I do hereby declare that the following is a full, clear, and exact description thereof, which will enable those skilled in the art to make and use the same.

It is found in use that the covering of the springs or hoops of hoop-skirts, and especially of the lower or bottom ones, wears out much sooner than the other parts of the skirt, necessitating the throwing away of the old skirt and the purchase of a new one much sooner than would otherwise be necessary. This arises from the fact that these hoops are continually coming in contact with the floor, steps, pavement, &c., and thereby the covering becomes quickly worn.

My invention has for its object to protect the covering of the hoops or springs and preserve them from becoming worn, and thus promote the durability of the skirt.

And it consists in enamelling the covering of the hoops or springs, or of so many of them as may be necessary, with a composition prepared of the ingredients and in the manner and proportions hereinafter more fully described. In preparing the enamel, I use white lead to form its body; ground pumice-stone to give it the necessary preservative quality; a varnish known in the trade as "Carriage No. 1 Varnish," or its equivalent, to give tenacity to the enamel; and turpentine to reduce it to the proper consistency for applying it to the hoops. I usually apply two coats of the enamel to the hoops or springs. The first coat is composed of dry white lead and ground pumice-stone in equal parts, varnish and turpentine being added, in the proportions of two parts of varnish to one part of turpentine, in sufficient quantity to reduce the mixture to a semi-fluid state, so that it may be readily applied to the hoops or springs. The second coat is composed of three parts of dry white lead, one part of ground pumice-stone, and a sufficient quantity of the varnish to reduce the mixture to the proper consistency for application. The second coat may be applied about four hours after the application of the first one, allowing ample time for the enamel to dry. If properly prepared, the enamel becomes very hard, is water-proof, may be wiped off when soiled, and prevents the hoops or springs from rusting. In applying the enamel, the wire or spring is covered with webbing in the ordinary manner, and the enamel may then be applied with a brush or in any other convenient manner. I prefer to apply it by passing the covered wire through a trough or other suitable vessel containing the prepared enamel, and then passing it between a pair of rubber rollers to force the said enamel into the covering of the wire, and leave the outside smooth and finished, but the manner in which it is applied is immaterial.

I claim as new, and desire to secure by Letters Patent—

Enamelling the covering of the hoops or springs of a hoop-skirt, or of so many of them as may be necessary, with a composition prepared of the ingredients, and in the manner and proportions herein described and set forth.

The above specification of my invention signed by me this 26th day of December, 1866.

WM. S. RYERSON.

Witnesses:
WM. F. MCNAMARA,
JAMES T. GRAHAM.